(12) United States Patent
Cooke et al.

(10) Patent No.: US 8,917,968 B2
(45) Date of Patent: Dec. 23, 2014

(54) FURCATION PLUGS HAVING SEGREGATED CHANNELS TO GUIDE EPOXY INTO PASSAGEWAYS FOR OPTICAL FIBER FURCATION, AND RELATED ASSEMBLIES AND METHODS

(71) Applicant: Corning Optical Communications LLC, Hickory, NC (US)

(72) Inventors: Terry Lee Cooke, Hickory, NC (US); Christopher Shawn Houser, Hickory, NC (US); Ronald Alan Leonard, Connelly Springs, NC (US); James McKinnley Wilson, Bronston, KY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 13/771,737

(22) Filed: Feb. 20, 2013

(65) Prior Publication Data

US 2014/0126873 A1    May 8, 2014

Related U.S. Application Data

(60) Provisional application No. 61/722,839, filed on Nov. 6, 2012.

(51) Int. Cl.
*G02B 6/00* (2006.01)
*G02B 6/44* (2006.01)
(52) U.S. Cl.
CPC ............ *G02B 6/4471* (2013.01); *G02B 6/4477* (2013.01)
USPC .......................................................... 385/139
(58) Field of Classification Search
CPC ...... G02B 6/3885; G02B 6/3861; G02B 6/04; G02B 6/3869; G02B 6/4471; G02B 6/4477

USPC .......................................... 385/139, 136–138
See application file for complete search history.

(56) References Cited

U.S. PATENT DOCUMENTS 5,046,814 A * 9/1991 Crespo-Ruiz et al. ........ 385/113
8,290,333 B2 * 10/2012 Barlowe et al. ............... 385/137
(Continued)

FOREIGN PATENT DOCUMENTS

WO    WO 2009/049037 A2    4/2009    .............. G02B 6/00
WO    WO 2010/025346 A1    3/2010    .............. G02B 6/255

OTHER PUBLICATIONS

Patent Cooperation Treaty, Invitation to Pay Additional Fees for International Application No. PCT/US2013/068272; Mailing Date Jan. 27, 2014—4 pages.

*Primary Examiner* — Ellen Kim

(57) ABSTRACT

Embodiments disclosed herein include furcation plugs having segregated channels to guide epoxy into passageways for optical fiber furcation, and related assemblies and methods. The furcation plugs secure furcated fiber optic cables to fiber optic equipment to prevent the furcated fiber optic cables from being damaged. The furcation plugs, as part of fiber optic furcation assemblies, are typically installed on fiber optic equipment that provides fiber optic components to which the optical fibers are connected. The fiber optic cables may be inserted into fiber passageways of the furcation plugs and secured to the furcation plugs with epoxy. The epoxy may be guided into the fiber passageways through segregated epoxy channels of the furcation plug. In this manner, epoxy may be more uniformly distributed within the fiber passageway to improve the epoxy bonds by reducing the occurrence of air pockets known as voids, which can weaken the epoxy bonds and cause attenuation.

11 Claims, 13 Drawing Sheets

(56) References Cited

U.S. PATENT DOCUMENTS

| | | | |
|---|---|---|---|
| 8,523,455 B2* | 9/2013 | Luther et al. | 385/60 |
| 2002/0045811 A1* | 4/2002 | Kittrell et al. | 600/407 |
| 2008/0253718 A1* | 10/2008 | Kachmar | 385/76 |
| 2008/0253719 A1* | 10/2008 | Kachmar | 385/86 |
| 2011/0280525 A1 | 11/2011 | Marcouiller et al. | 385/99 |
| 2012/0177328 A1 | 7/2012 | Marcouiller et al. | 385/99 |
| 2012/0328253 A1* | 12/2012 | Hurley et al. | 385/103 |
| 2014/0050444 A1* | 2/2014 | Skluzacek et al. | 385/77 |

* cited by examiner

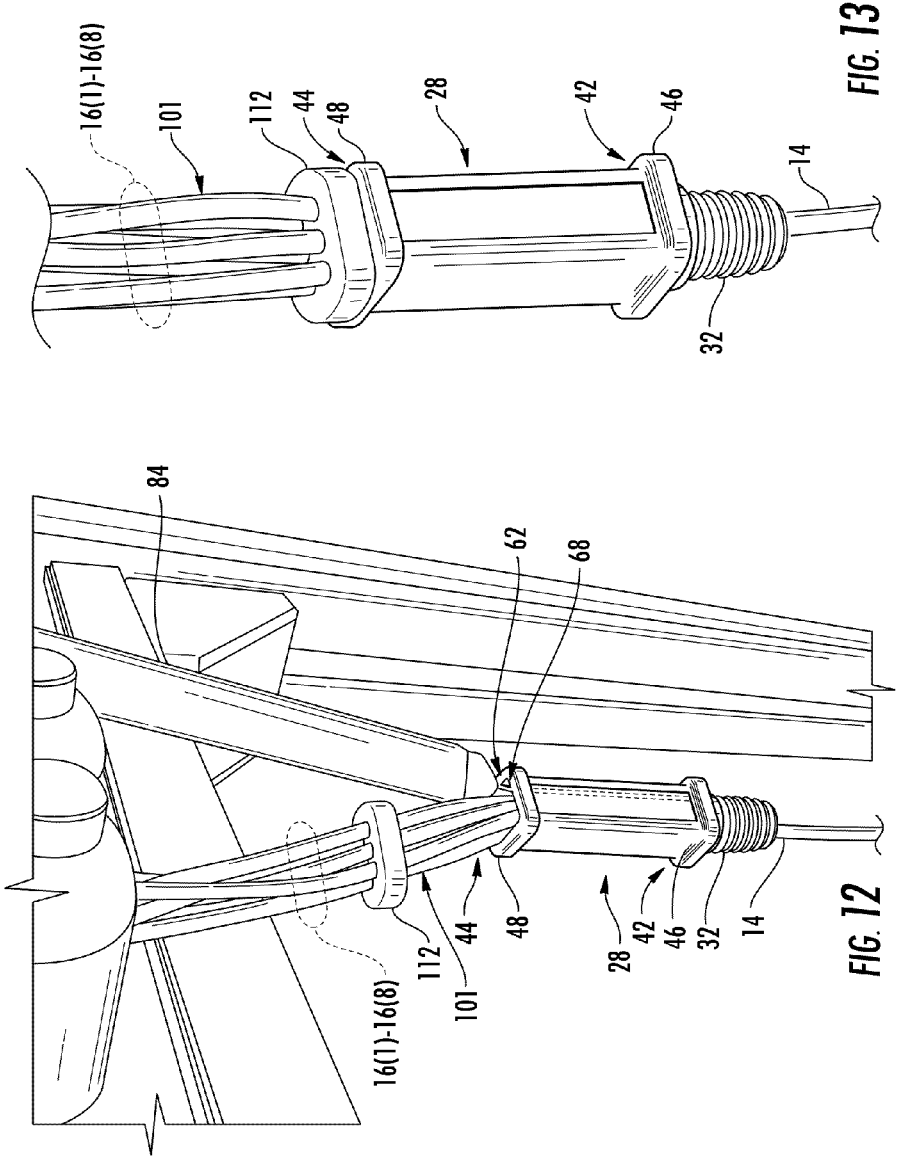

FURCATION PLUGS HAVING SEGREGATED CHANNELS TO GUIDE EPOXY INTO PASSAGEWAYS FOR OPTICAL FIBER FURCATION, AND RELATED ASSEMBLIES AND METHODS

RELATED APPLICATIONS

This application claims the benefit of priority under 35 U.S.C. §119 of U.S. Provisional Application Ser. No. 61/722, 839 filed on Nov. 6, 2012 the content of which is relied upon and incorporated herein by reference in its entirety.

BACKGROUND

1. Field of the Disclosure

The technology of the disclosure relates to fiber optic furcation plugs and assemblies for fiber optic cables, which may be used in securely mounting fiber optic cables in fiber optic equipment.

2. Technical Background

Optical fiber is increasingly being used for a variety of applications including but not limited to broadband voice, video, and data transmission. Benefits of optical fiber use include extremely wide bandwidth and low noise operation. With the increasing and varied use of optical fibers, it is important to provide reliable methods of routing optical fibers to subscribers. As a result, fiber optic communications networks include a number of interconnection points at which multiple optical fibers are interconnected. Fiber optic communications networks can readily extend fiber optic communications services to a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx."

In telecommunication infrastructure installations, including FTTx installations, fiber optic cables, such as trunk cables for example, are pulled to fiber optic equipment to establish optical connections. The fiber optic cables are furcated to separate out individual optical fibers for making optical connections with fiber optic components contained in the fiber optic equipment. The furcation is typically made in a furcation assembly, such as a furcation epoxy plug for example. To secure the fiber optic cable to fiber optic equipment and prevent it from being damaged or kinked, the furcation assembly is typically installed on the tray, rack, or housing of fiber optic equipment providing fiber optic components to which the optical fibers are connected.

When furcating a fiber optic cable to create a furcation assembly, a process called "break-out" or "fan-out" is provided. Optical fibers protected in a single fiber optic cable are made available to branch out in different directions to be terminated independent of one another. Break-out occurs at an end portion of the fiber optic cable where an outer jacket of the fiber optic cable is removed between an end of the fiber optic cable up to a transition point. The optical fibers are vulnerable to damage at the end portion of the fiber optic cable as they are no longer surrounded by the outer jacket nor protected from longitudinal and axial forces by strength members, which are strands of strong fibers that support the optical fibers in the fiber optic cable. The optical fibers at the end portion of the fiber optic cable are sometimes called "fiber legs."

Conventional fiber optic furcation plugs provide for epoxy to be disposed inside the furcation body to bond the fiber optic furcation plug with strength members and optical fibers disposed in a fiber optic cable jacket. First, the fiber legs are inserted through a fiber optic furcation plug so that the transition point, a portion of the fiber legs adjacent to the transition point, and a portion of the cable jacket adjacent to the transition point are disposed within the fiber optic furcation plug. The fiber optic furcation plug is then sealed at the bottom where the outer jacket extends out of the furcation plug. Once the fiber optic furcation plug is positioned vertically so the bottom is facing down, an epoxy syringe is inserted down into the fiber optic furcation plug between the fiber legs of the fiber optic cable until an end of the epoxy syringe reaches the bottom portion of the fiber optic furcation plug. Next, epoxy is injected from the syringe into the bottom portion of the fiber optic furcation plug until the plug is filled. Finally the epoxy syringe is removed. When the epoxy is cured and forms a bond between the fiber legs, strength members, and fiber optic furcation plug, the fiber legs and the strength members may be securely attached to the fiber optic furcation plug. The fiber optic furcation plug may then be installed in an enclosure rack or patch panel and the fiber legs terminated.

Disposing epoxy in a fiber optic furcation plug by inserting the epoxy syringe into the fiber optic furcation plug between the fiber legs of the fiber optic cable may result in certain issues. First, the epoxy syringe could damage the optical fibers as the syringe is forced between the fiber legs. Also, the end of the epoxy syringe is difficult to precisely position when the syringe enters the fiber optic furcation plug because, for example, optical fibers and/or strength members may obstruct the path of the epoxy syringe. Precise positioning of the syringe is important to facilitate a uniform distribution of the epoxy within the fiber optic furcation plug; otherwise voids may form within the fiber optic furcation plug. These voids may change shape according to humidity and temperature, thereby causing unwanted attenuation in the adjacent fiber optic cables as they subject these adjacent fiber legs to expansion and contraction forces as they change shape. Further, as the voids are pockets of air, they may occupy volume that would ordinarily be taken up by strength-contributing epoxy, thereby weakening the attachment between the fiber optic furcation plug and the end portion of the fiber optic cable. If the fiber optic cable secured in the plug is subjected to an unexpected tension, as sometimes occurs as cables are installed or upgraded, then the fiber optic furcation plug may break.

Moreover, there is an increasing need for fiber optic furcation plugs to be provided in smaller sizes as installation requirements demand that fiber optic furcation plugs be pulled through smaller conduits at installation sites. As the fiber optic furcation plug is reduced in size, it may be more difficult to insert the epoxy syringe between the fiber legs and the passageway of the fiber optic furcation plug without damaging the optical fibers or misdirecting the epoxy syringe during the insertion of the epoxy.

SUMMARY OF THE DETAILED DESCRIPTION

Embodiments disclosed herein include furcation plugs having segregated channels to guide epoxy into passageways for optical fiber furcation, and related assemblies and methods. The furcation plugs secure furcated fiber optic cables to fiber optic equipment to prevent the furcated fiber optic cables from being damaged. The furcation plugs, as part of fiber optic furcation assemblies, are typically installed on fiber optic equipment that provides fiber optic components to which the optical fibers are connected. The fiber optic cables may be inserted into fiber passageways of the furcation plugs and secured to the furcation plugs with epoxy. The epoxy may be guided into the fiber passageways through segregated epoxy channels of the furcation plug. In this manner, epoxy may be more uniformly distributed within the fiber passageway to improve the epoxy bonds by reducing the occurrence of air pockets known as voids, which can weaken the epoxy bonds and cause attenuation.

In this regard, in one example, a fiber optic furcation plug is provided. The fiber optic furcation plug may include a furcation body extending longitudinally from a first end to a second end. The fiber optic furcation plug may also include a fiber passageway disposed through the furcation body extending from a first opening at the first end of the furcation body to a second opening at the second end of the furcation body. The fiber passageway may be configured to receive an end portion of at least one optical fiber of a fiber optic cable. The fiber optic furcation plug may also include a segregated epoxy channel disposed in the furcation body and segregated from the fiber passageway. The segregated epoxy channel may be configured to receive epoxy and guide the epoxy through an epoxy interface opening into the fiber passageway. In this manner, the epoxy may be guided into the fiber passageway without displacing at least one optical fiber to accommodate an epoxy syringe.

In another example, a fiber optic furcation assembly is provided. The fiber optic furcation assembly may include a fiber optic cable comprising at least one optical fiber disposed in a cable jacket, wherein an end portion of the at least one optical fiber may be exposed from the cable jacket to form at least one fiber leg. The fiber optic furcation assembly may also include a fiber optic furcation plug, including a furcation body extending longitudinally from a first end to a second end and configured to receive epoxy and thereby be secured to the at least one optical fiber. The fiber optic furcation plug may also include a fiber passageway disposed through the furcation body extending from a first opening at the first end of the furcation body to a second opening at the second end of the furcation body. The fiber passageway may be configured to receive at least one end portion of at least one optical fiber of a fiber optic cable. The fiber optic furcation plug may also include a segregated epoxy channel disposed in the furcation body and segregated from the fiber passageway. The segregated epoxy channel may be configured to receive epoxy and guide the epoxy through an epoxy interface opening into the fiber passageway. In this manner, the epoxy may be more uniformly distributed in the fiber passageway to reduce an incidence of voids, which can weaken the bond between the fiber optic cable and the fiber optic furcation plug, and which may cause optical attenuation.

In another example, a method of furcating a fiber optic cable is provided. The method may include providing a fiber optic cable comprising at least one optical fiber disposed within a cable jacket. The method may also include exposing an end portion of the at least one optical fiber from the cable jacket to form at least one fiber leg. The method may also include providing a fiber optic furcation plug, including a furcation body extending longitudinally from a first end to a second end. The method may also include receiving the at least one fiber leg in a fiber passageway of the fiber optic furcation plug. The fiber passageway is disposed through the furcation body and may extend from a first opening at the first end of the furcation body to a second opening at the second end of the furcation body. The method may also include receiving epoxy in a segregated epoxy channel which guides the epoxy through an epoxy interface opening into the fiber passageway to secure the at least one fiber leg to the furcation body. In this manner, the epoxy may form an epoxy bond with the fiber optic furcation plug with fewer voids that may cause optical attenuation when exposed to changes in humidity or temperature.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 12 is a perspective view of epoxy being received into the segregated channel from an epoxy syringe; and FIG. 13 is a perspective view of the fiber optic furcation plug of FIG. 1 with the epoxy cured, illustrating the fiber optic furcation plug before installation to the fiber optic equipment of FIG. 1.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include furcation plugs having segregated channels to guide epoxy into passageways for optical fiber furcation, and related assemblies and methods. The furcation plugs secure furcated fiber optic cables to fiber optic equipment to prevent the furcated fiber optic cables from being damaged. The furcation plugs, as part of fiber optic furcation assemblies, are typically installed on fiber optic equipment that provides fiber optic components to which the optical fibers are connected. The fiber optic cables may be inserted into fiber passageways of the furcation plugs and secured to the furcation plugs with epoxy. The epoxy may be guided into the fiber passageways through segregated epoxy channels of the furcation plug. In this manner, epoxy may be more uniformly distributed within the fiber passageway to improve the epoxy bonds by reducing the occurrence of air pockets known as voids, which can weaken the epoxy bonds and cause attenuation.

Figure 1:
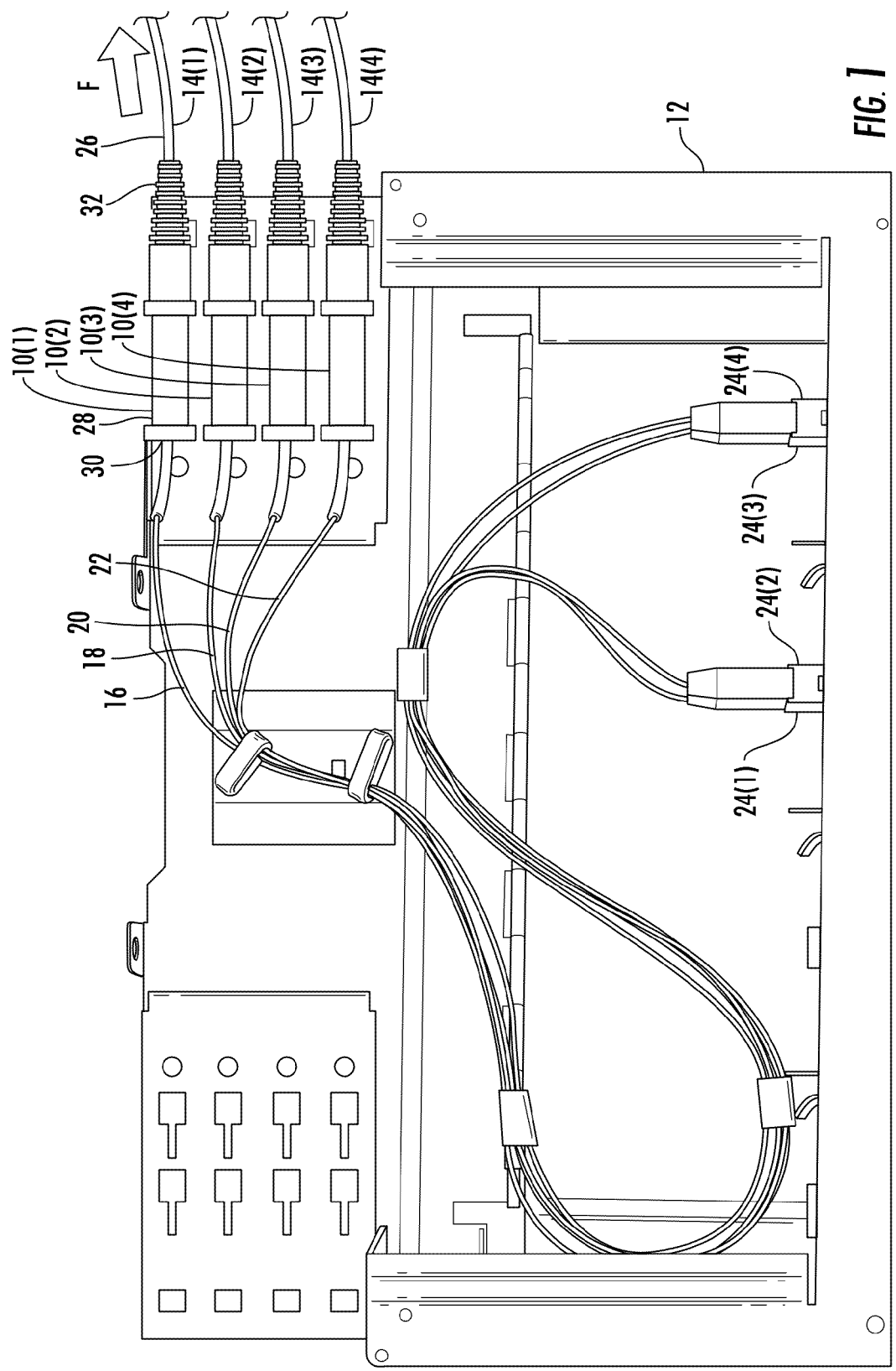
FIG. 1 is a top view of a fiber optic furcation assembly including a fiber optic cable having at least one optical fiber disposed within a cable jacket attached to fiber optic equipment and thereby securing the fiber optic cable to the fiber optic equipment to protect the optical fiber.

In this regard, FIG. 1 is a top view of fiber optic furcation assemblies 10(1)-10(4) installed on fiber optic equipment 12. The fiber optic furcation assemblies 10(1)-10(4) include fiber optic cables 14(1)-14(4), respectively, which are furcated to separate out individual optical fibers. In the simplified example depicted in FIG. 1, the fiber optic cables 14(1)-14(4) may include optical fibers 16, 18, 20, 22, respectively. Each of these individual optical fibers 16, 18, 20, 22 may be optically connected with fiber optic components 24(1)-24(4) disposed in the fiber optic equipment 12. In this manner, the fiber optic equipment 12 serves to protect, organize, and consolidate the fiber optic components 24(1)-24(4) and optical fibers 16, 18, 20, 22 while connected. However, each of the fiber optic cables 14(1)-14(4) may include a plurality of optical fibers 16(1)-16(8) as shown later in FIG. 6.

The fiber optic furcation assembly 10(1) may also include a fiber optic furcation plug 28. The fiber optic furcation plug 28 is secured to the at least one optical fiber 16 with epoxy 30. Further, the fiber optic furcation plug 28 may be secured to the fiber optic equipment 12 with mechanical means (not shown) to secure the fiber optic cable 14(1) to the fiber optic equipment 12. In this manner, the optical fiber 16 may be protected from outside forces F (FIG. 1) which are isolated to an outside of the fiber optic equipment 12 by the epoxy bond between the fiber optic cable 14 and the fiber optic furcation plug 28, and the mechanical means connecting the fiber optic furcation plug 28 to the fiber optic equipment 12.

It is noted that the fiber optic equipment 12 may accommodate more or less than four (4) of the fiber optic cables 14(1)-14(4). Further, it is noted that each of the fiber optic cables 14(1)-14(4) may include more than one (1) of the optical fibers 16, 18, 20, 22, respectively. In this manner, the optical fiber 16 may be replaced with optical fibers 16(1)-16(8) as depicted later in FIG. 6.

As will be discussed in more detail herein, the fiber optic furcation plug 28 of fiber optic furcation assembly 10(1) may be mounted to the fiber optic equipment 12 and may form a secure attachment with an end portion 56 the fiber optic cable 14(1). The secure attachment is provided by a bonding agent, for example, epoxy 30, which is guided into the fiber optic furcation assembly 10(1) using a segregated epoxy channel 62. The segregated epoxy channel 62 provides a substantially uniform distribution of the epoxy 30 within the fiber optic furcation plug 28 of the fiber optic furcation assembly 10(1) and thereby provides an epoxy bond with fewer voids, which can weaken the epoxy bond and cause optical attenuation as will be discussed later.

For simplicity, details of the fiber optic furcation assembly 10(1) (hereinafter "fiber optic furcation assembly 10") including the fiber optic cable 14(1) (hereinafter "fiber optic cable 14") will be discussed with the understanding that the same details may also apply to others of the fiber optic furcation assemblies 10(2)-10(4) including the fiber optic cables 14(2)-14(4). The fiber optic furcation assembly 10 may include the fiber optic cable 14. The fiber optic cable 14 may include the optical fibers 16(1)-16(8) disposed within a cable jacket 26. The cable jacket 26 protects the optical fibers 16(1)-16(8) outside the fiber optic equipment 12.

Now that details of how the fiber optic furcation assembly 10 interfaces with the fiber optic equipment 12 have been introduced, the details of the fiber optic furcation plug 28 of the fiber optic furcation assembly 10 will now be provided. In addition to the fiber optic cable 14, the fiber optic furcation assembly 10 also includes shrink wrap 86 and strain relief boot 32, but these other components will be discussed later.

Figure 2:
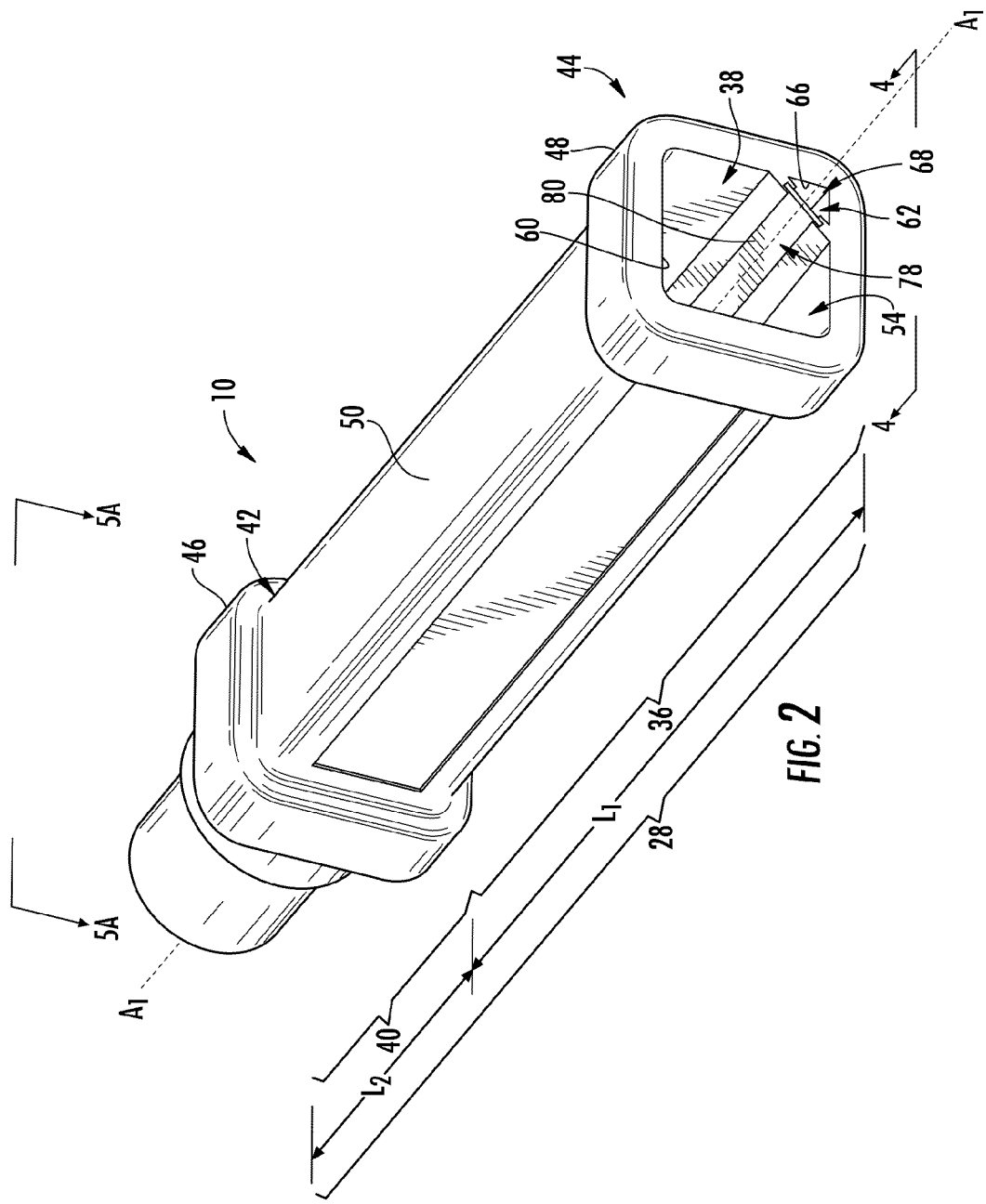
FIG. 2 is a perspective view of a fiber optic furcation plug of the fiber optic furcation assembly of FIG. 1 illustrating a cable holder attached to a fiber optic furcation body.

FIG. 2 is a perspective view of the fiber optic furcation plug 28 of FIG. 1. The fiber optic furcation plug 28 may include a furcation body 36, a fiber passageway 38, segregated epoxy channel 62, a cable holder 40, a first flange 46, and a second flange 48. The fiber optic furcation plug 28 forms a secure attachment to the fiber optic cable 14 and the fiber optic equipment 12, as discussed above to protect the optical fibers 16(1)-16(8) from forces F external to the fiber optic equipment 12 (FIG. 1).

With continuing reference to FIG. 2, the furcation body 36 may extend longitudinally along a length $L_1$ from a first end 42 to a second end 44. A longitudinal direction is depicted by a longitudinal axis $A_1$ in FIG. 2. It is noted that a latitudinal direction is any direction orthogonal to the longitudinal direction. The furcation body 36 may include at least one external surface 50 which provides an interface to be attached to the fiber optic equipment 12. The furcation body 36 may comprise a strong rigid material, for example, metal or plastic. In this manner, the fiber optic furcation body may withstand the forces F external to the fiber optic equipment 12 which may undesirably pull the fiber optic furcation assembly 10 from the fiber optic equipment 12 and/or damage the optical fibers 16(1)-16(8).

The furcation body 36 may also include the fiber passageway 38. The fiber passageway 38 may be disposed through the furcation body 36 and may extend from a first opening 52 (FIG. 3A) at the first end 42 of the furcation body 36 to a second opening 54 at the second end 44. The fiber passageway 38 may or may not be tapered so that the second opening 54 may be greater in size than the first opening 52. In this manner, the optical fiber 16 and strength member 17 may separate longitudinally within the fiber passageway 38 to fill the larger size of the second opening 54. The epoxy 30 may occupy this additional space between the optical fiber 16 and the strength member 17 to create a solid attached bundle of: the epoxy 30, the optical fiber 16, and the strength member 17. The solid attached bundle may be larger than the size of the first opening 52 and thus prevent this larger connected bundle from exiting the first opening 52.

The fiber passageway 38 may be configured to receive the end portion 56 (FIG. 7) of the at least one optical fiber 16 of the fiber optic cable 14. The fiber passageway 38 may be formed at least partially by an inner surface 60 of the furcation body 36. The inner surface 60 may be formed, for example, when the furcation body 36 is molded to eliminate an added manufacturing expense of an additional material removal operation. The fiber passageway 38 provides protection for the optical fibers 16 and thereby prevents humidity and contaminants from damaging the optical fibers 16.

The fiber optic furcation plug 28 may also include a segregated epoxy channel 62. The segregated epoxy channel 62 may be disposed in the furcation body 36 and segregated from the fiber passageway 38. In this manner, the segregated epoxy channel 62 may be free of the optical fibers 16(1)-16(8) which may be contained latitudinally within the fiber passageway 38 and thereby do not obstruct the passage of the epoxy 30 through the segregated epoxy channel 62. The segregated epoxy channel 62 may be configured to receive the epoxy 30 and guide the epoxy 30 through an epoxy interface opening 64 (FIG. 3B), which may lead into the fiber passageway 38. The segregated epoxy channel 62 may be formed at least partially by a second inner surface 66 (FIG. 3A) of the furcation body 36. The second inner surface 66 may be formed, for example, when the furcation body 36 is molded to save manufacturing expense.

FIGS. 3A-5B illustrate additional features of the segregated epoxy channel 62. The segregated epoxy channel 62 may extend longitudinally from the first end 42 of the furcation body 36 to the second end 44 of the furcation body 36. In this way, the epoxy 30 may enter the segregated epoxy channel 62 at an epoxy entrance 68 of the second end 44 of the furcation body 36 and exit the segregated epoxy channel 62 at the epoxy interface opening 64 at the first end 42 of the furcation body 36. An advantage of having the epoxy entrance 68 at the second end 44 is that a human operator can easily observe the second opening 54 of the furcation body 36 to ensure that the epoxy 30 does not overflow and the second opening 54 of the furcation body 36 when the second opening 54 may be facing up while the epoxy 30 may be received by the fiber passageway 38.

Figure 3A:
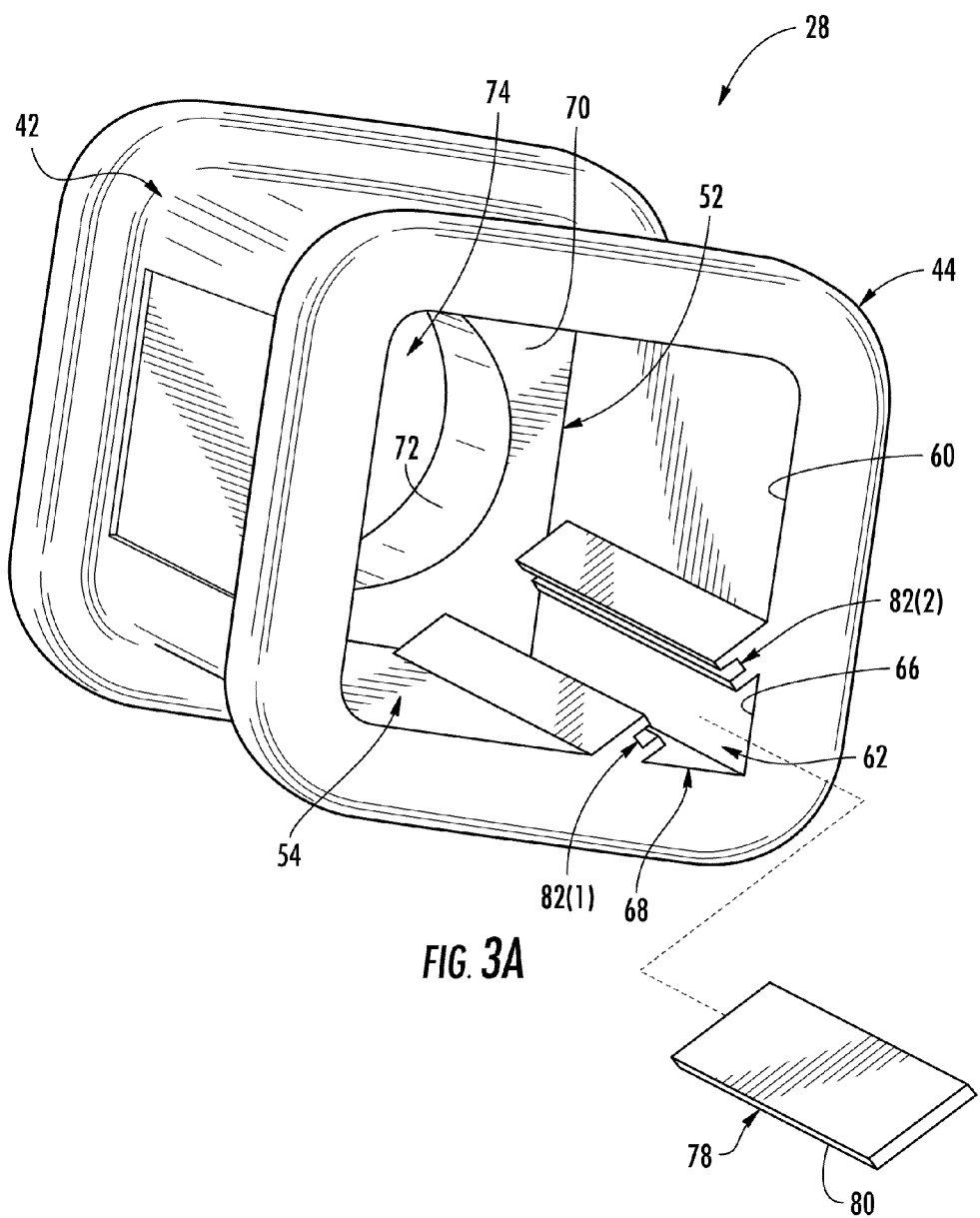
FIGS. 3A and 3B are perspective exploded views of the fiber optic furcation plug of FIG. 1 illustrating a shim of the fiber optic furcation plug detached and attachably secured, respectively, to form a segregated epoxy channel.
Figure 3B:
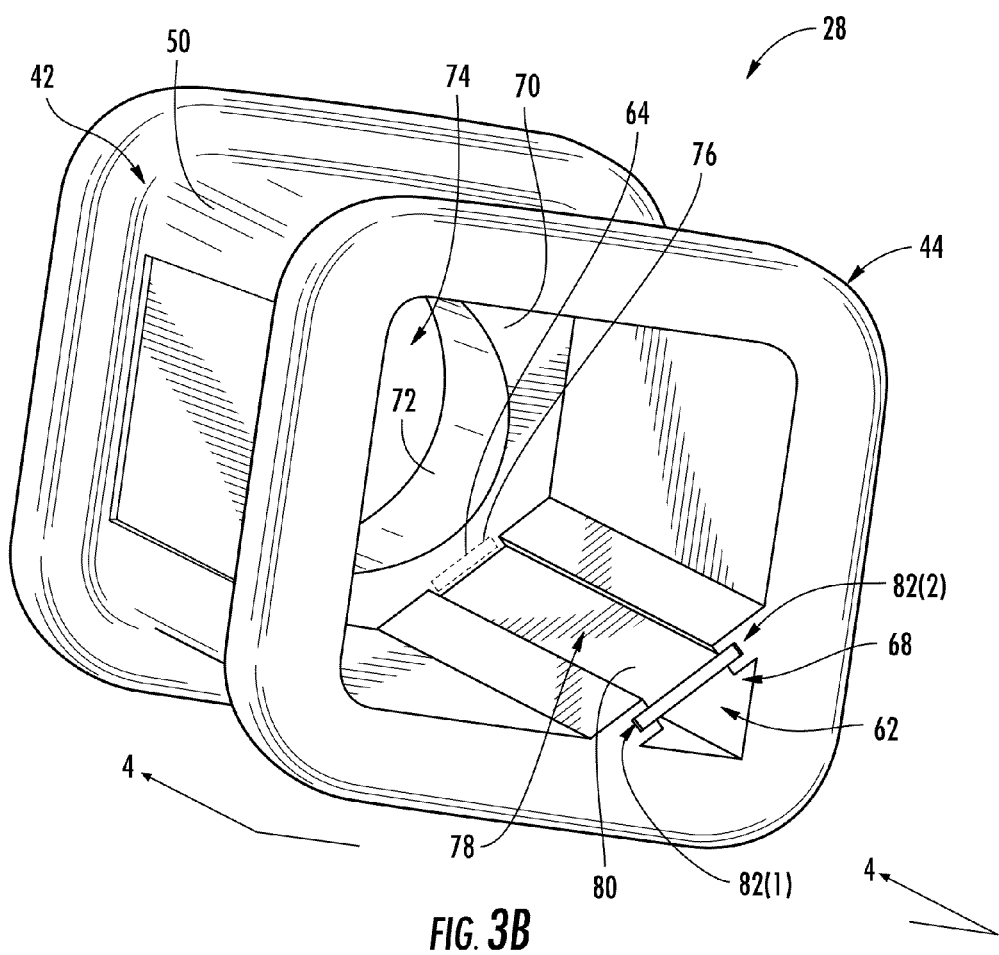
Figure 4:
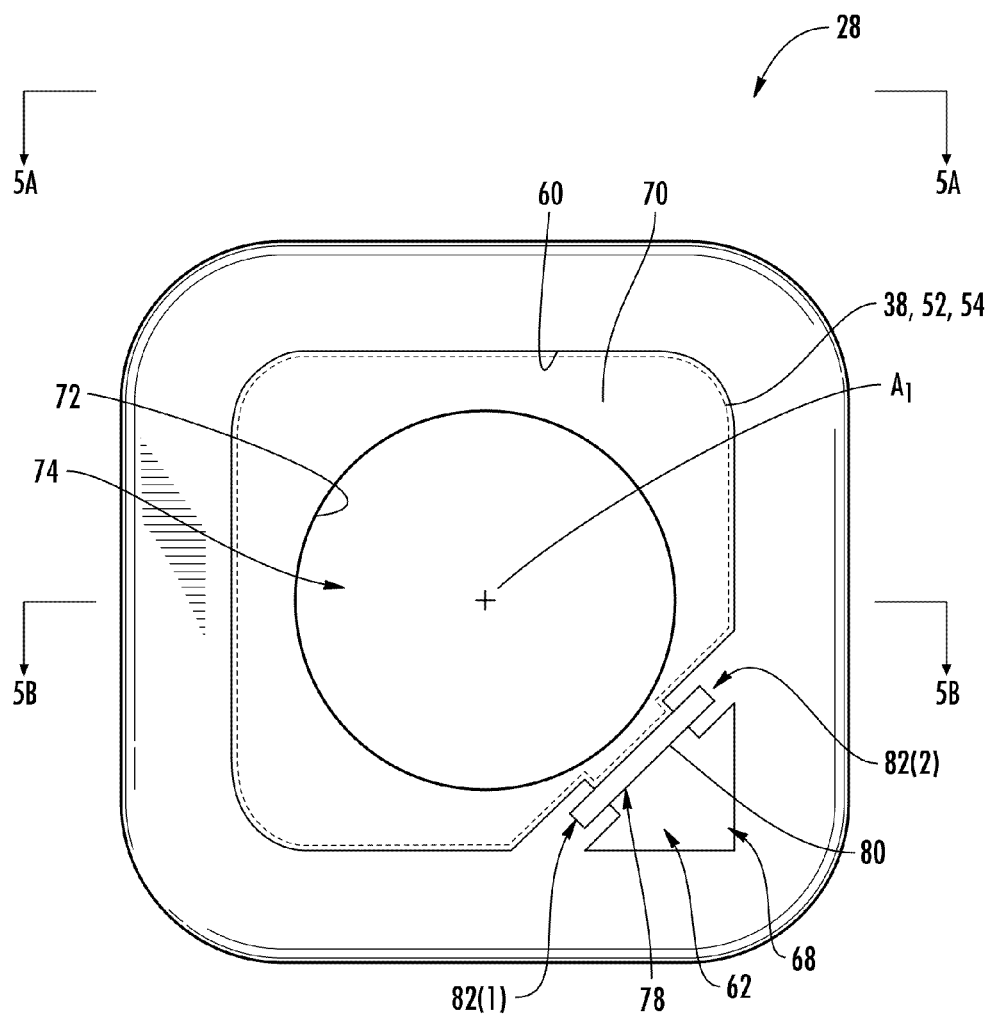
FIG. 4 is a longitudinal view from a second end of the fiber optic furcation plug of FIG. 1 illustrating shapes of a fiber passageway and a segregated epoxy channel.
Figures 5A, 5B:
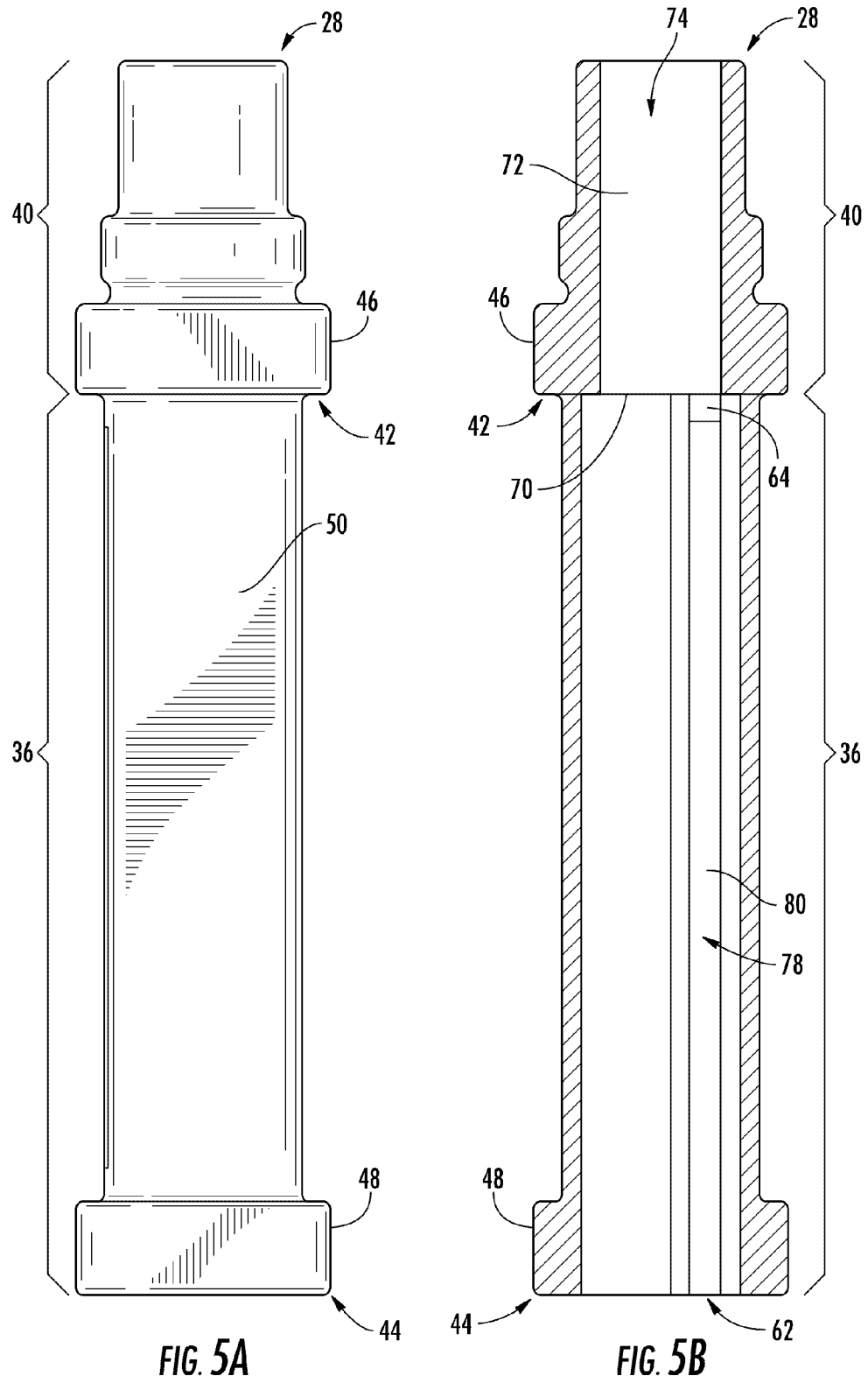
FIGS. 5A and 5B are a side view and a cutaway side view, respectively, of the fiber optic furcation plug of FIG. 1 further illustrating the shapes of the fiber passageway and the segregated epoxy channel.

As shown in FIGS. 2-4, the segregated epoxy channel 62 may be formed by a separation wall 78 of the fiber optic furcation plug 28. Specifically, the separation wall 78 may form a portion of the periphery of the fiber passageway 38 and a portion of the periphery of the segregated epoxy channel 62. In this way, a size of the fiber optic furcation plug 28 may be minimized by eliminating additional walls to fully enclose the segregated epoxy channel 62 independent of the fiber passageway 38.

The separation wall 78 may comprise a shim 80 which may be attachably secured to the furcation body 36. The shim 80 may be made of a strong material to resist bending, for example, metal or plastic. The furcation body 36 may include at least one groove 82(1), 82(2) to which the separation wall 78 may be attachably secured. The shim 80 may be attachably secured to the furcation body 36 to keep the segregated epoxy channel 62 free of the end portion 56 of the fiber optic cable 14. In this manner, the epoxy 30 may be more easily guided through the segregated epoxy channel 62 as there are no optical fibers 16 to obstruct the segregated epoxy channel 62. It is noted that in having the separation wall 78 attachably secured to the furcation body 36, the manufacturing cost of the furcation body 36 may be reduced.

Moreover, the segregated epoxy channel 62 may have a uniform cross-section to permit an epoxy syringe 84 (FIG. 7) to be inserted into the segregated epoxy channel 62 in order to insert the epoxy 30 near the epoxy interface opening 64. In this manner, the epoxy 30 may be more uniformly guided to the epoxy interface opening 64 where it can enter the fiber passageway 38.

Within continued reference to FIG. 2, the fiber optic furcation plug 28 may also include the cable holder 40 which may attach the cable jacket 26 of the fiber optic cable 14 to the furcation body 36, and thus prevent the epoxy 30 from leaking from the fiber passageway 38. The cable holder 40 may extend longitudinally along a length $L_2$ from the first end 42 of the furcation body 36. The cable holder 40 may be attached to the first end 42 of the furcation body 36 or formed integrally with the furcation body 36 to reduce manufacturing expense. The cable holder 40 may be made of a strong material resistant to deformation, for example, metal or plastic.

The cable holder 40 may include an inner cable holder surface 72 forming a cable holder opening 74 (FIG. 3A). The cable holder opening 74 may be configured to allow the end portion 56 of the at least one optical fiber 16 of the fiber optic cable 14 to enter the fiber passageway 38 and to interface with the cable jacket 26. The shape of the cable holder opening 74 may be, for example, substantially circular to conform to a shape of an outer surface 58 of the cable jacket 26. In this manner, leakage of the epoxy 30 through the cable holder opening 74 may be minimized and the epoxy 30 may instead be retained within the fiber passageway 38 to create the attachment between the furcation body 36 and the fiber optic cable 14.

Moreover, the cable holder 40 may also include an end wall 70. The end wall 70 may partially close the fiber passageway 38 at the first end 42 of the furcation body 36. In this manner, ingress of the end portion 56 of the fiber optic cable 14 into the first opening 52 of the furcation body 36 may be made easier. Further, egress of the end portion 56 from the fiber passageway 38 into the cable holder opening 74 through the first opening 52 may be made difficult because the epoxy 30 attached to the optical fibers 16(1)-16(8) and strength members 17 form a latitudinally larger structure that may not enter the cable holder opening 74, which may be narrower than the fiber passageway 38.

It is noted that the end wall 70 of the cable holder 40 may form at least a portion 76 of the epoxy interface opening 64. In this way, the epoxy 30 may flow into the fiber passageway 38 near the end wall 70 and more uniformly fill the fiber passageway 38 to reduce an occurrence of voids.

With continuing reference to FIG. 2, the fiber optic furcation plug 28 may also include a first flange 46 and a second flange 48 separated from the first flange 46 by at least one external surface 50. The first flange 46 and the second flange 48 may be used in combination with the external surface 50 and the mechanical means to secure the fiber optic furcation plug 28 to the fiber optic equipment 12. The mechanical means may be, for example, a mechanical clamp attached to the fiber optic equipment 12 to abut against the external surface 50 and the first flange 46, and the second flange 48 may prevent longitudinal movement of the fiber optic furcation plug 28 with respect to the mechanical clamp in the longitudinal direction. In this manner, the fiber optic furcation plug 28 may be secured to the fiber optic equipment 12.

The first flange 46 and the second flange 48 may be made of a strong material resistant to deformation, for example, metal or plastic. The first flange 46 and the second flange 48 may be made integral with the fiber optic furcation plug 28 or attached after the furcation body 36 and cable holder 40 are formed.

Now that details of the features of the fiber optic furcation plug 28 of the fiber optic furcation assembly 10 have been introduced, other features of the fiber optic furcation assembly 10 will be introduced. Specifically the optical fibers 16(1)-16(8), the shrink wrap 86, and the strain relief boot 32 are now introduced as shown in FIGS. 6-7.

Figure 6:
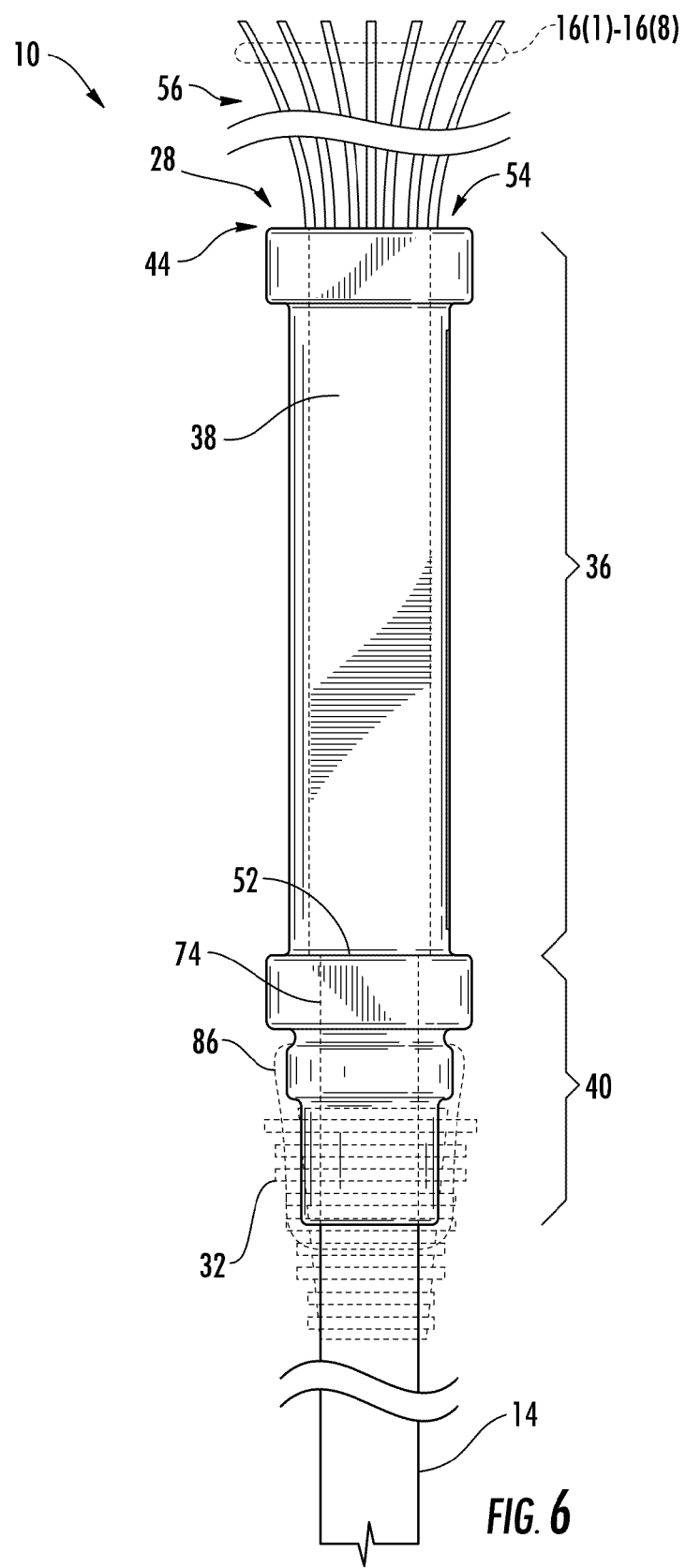
FIG. 6 is a side view of the fiber optic furcation assembly of FIG. 1 including the fiber optic furcation plug and an end portion of the fiber optic cable received in the fiber optic passageway of the fiber optic furcation plug, illustrating an orientation of the fiber optic cable with respect to the fiber optic furcation plug.
Figure 7:
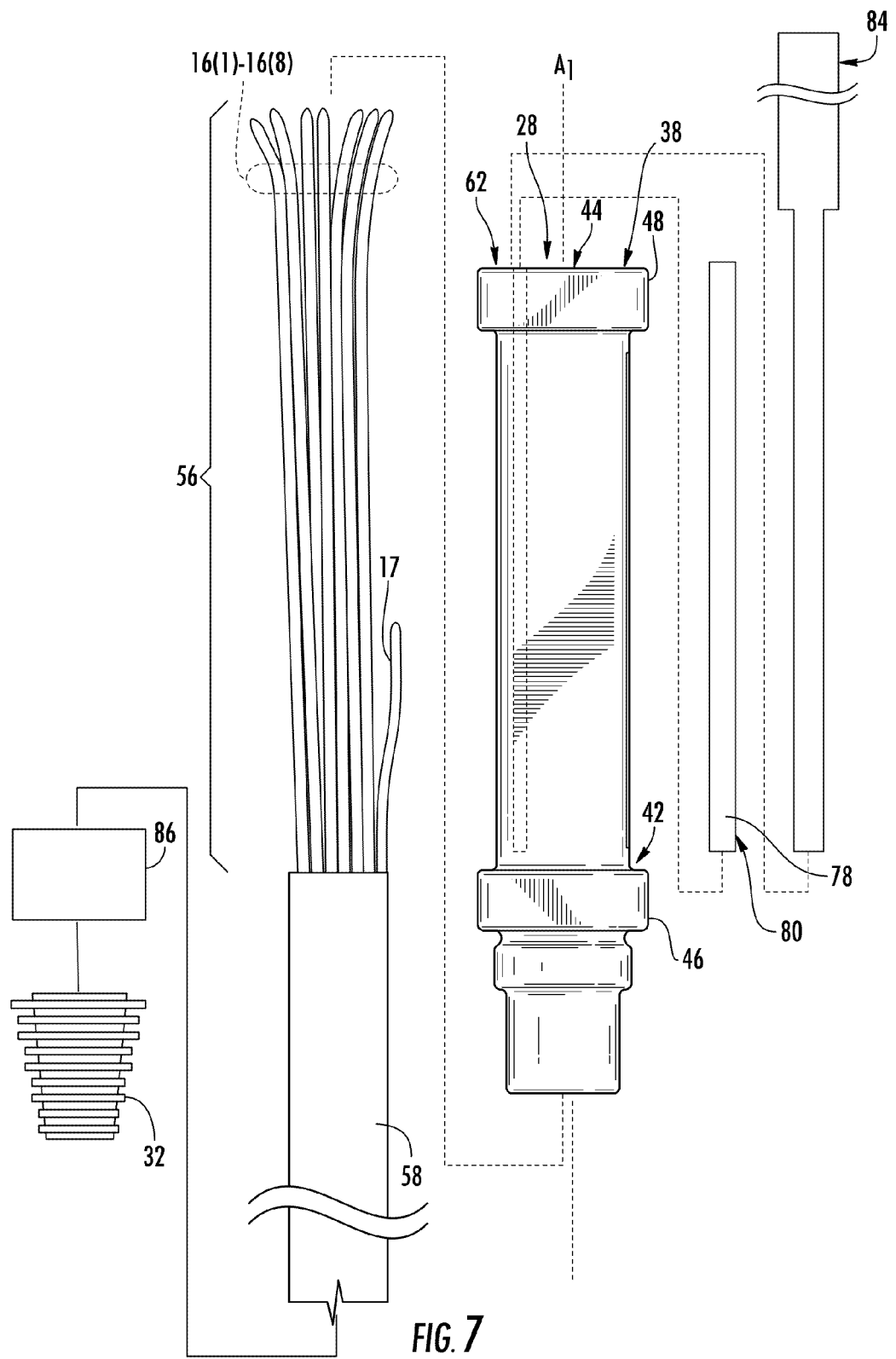
FIG. 7 is a side view of an epoxy syringe adjacent to an exploded view of the fiber optic furcation assembly of FIG. 1, to illustrate an interrelationship of components of the furcation assembly in regards to a temporary insertion of the epoxy syringe into the segregated epoxy channel.

FIG. 6 is a side view of the fiber optic furcation assembly 10 including the optical fibers 16(1)-16(8) of the end portion 56 of the fiber optic cable 14 extending from the fiber optic furcation plug 28 of FIG. 1. The end portion 56 of the fiber optic cable 14 may be received in the cable holder opening 74 of the cable holder 40 and received in the fiber passageway 38 of the furcation body 36. The end portion 56 may extend outside the second opening 54 of the furcation body 36 to form the optical connections with the fiber optic components 24 shown in FIG. 1.

With reference back to FIGS. 6-7, fiber optic furcation assembly 10 may also include a shrink wrap 86 which may be attached to the cable holder 40 and the cable jacket 26 of the fiber optic cable 14. The shrink wrap 86 may retain the epoxy 30 in the fiber passageway 38 by preventing the epoxy 30 from leaking out of the first opening 52 and the cable holder opening 74.

The fiber optic furcation assembly 10 may also include the strain relief boot 32 which may protect the fiber optic cable 14 from severe bending adjacent to the cable holder 40. Severe bending may cause damage to the fiber optic cable 14 and/or optical attenuation. The strain relief boot 32 may be made of flexible material resistant to bending, for example, rubber. The strain relief boot 32 may surround and abut the cable jacket 26 of the fiber optic cable 14 adjacent to the cable holder 40. In this manner, the strain relief boot 32 may bend commensurate to a bending of the fiber optic cable 14 disposed therein and thereby may resist the bending with the flexibility of the strain relief boot 32.

FIG. 7 depicts an exploded view of the fiber optic furcation plug 28 of FIG. 6 along with the epoxy syringe 84, fiber optic cable 14, the shrink wrap 86, and the strain relief boot 32. As is shown in FIG. 7, the fiber optic furcation assembly 10 may be constructed parallel in the longitudinal axis $A_1$ to increase simplicity. The end portion 56 of the fiber optic cable 14 may be routed through the shrink wrap 86 and the strain relief boot 32 before being received into the furcation body 36. The epoxy syringe 84 may be inserted temporary into the segregated epoxy channel 62 parallel to the longitudinal axis $A_1$ to inject the epoxy 30 into the segregated epoxy channel 62. In this manner, the epoxy 30 may fill up the fiber passageway 38 and the segregated epoxy channel 62 to notify the technician that the epoxy syringe 84 may be removed.

Figure 8:
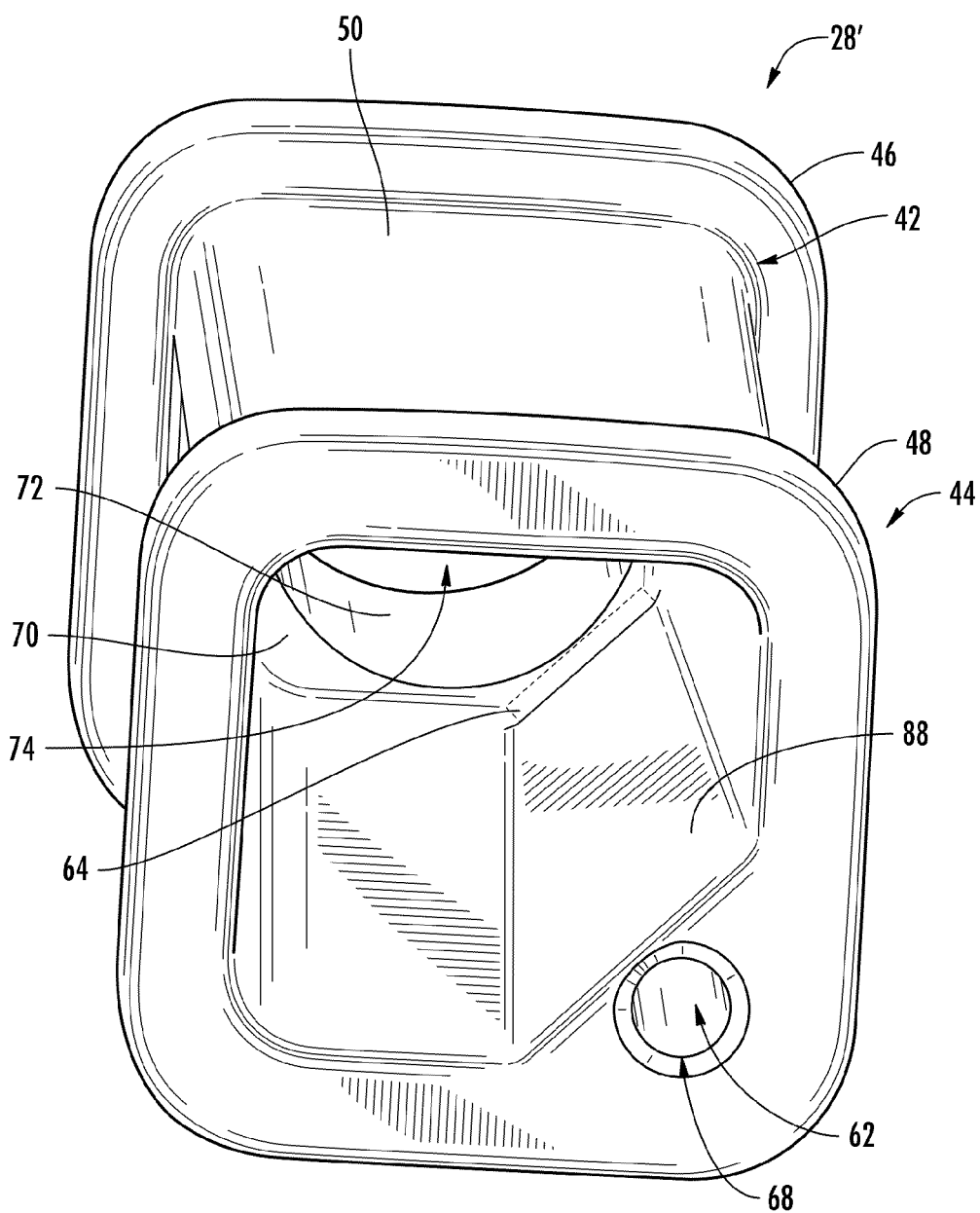
FIG. 8 is a perspective view of another example of a fiber optic furcation plug compatible with the fiber optic equipment of FIG. 1, illustrating another example of a segregated epoxy channel.

FIG. 8 is a perspective view of a fiber optic furcation plug 28' which is another example of the fiber optic furcation plug 28 of FIG. 1. Many features of the fiber optic furcation plug 28' are similar to the features of fiber optic furcation plug 28 and will not be repeated to increase conciseness and clarity. In this respect, fiber optic furcation plug 28' further comprises at least one fiber containment surface 88 configured to restrict latitudinal movement of the end portion 56 of the optical fibers 16 and at least partially defines the fiber passageway 38. The segregated epoxy channel 62 may be at least partially disposed between the external surface 50 of the furcation body 36 and the fiber containment surface 88. The epoxy interface opening 64 may be adjacent to the end wall 70. In this manner, the fiber optic furcation plug 28' may be created as a single integral component to reduce inventory costs.

Figure 9:
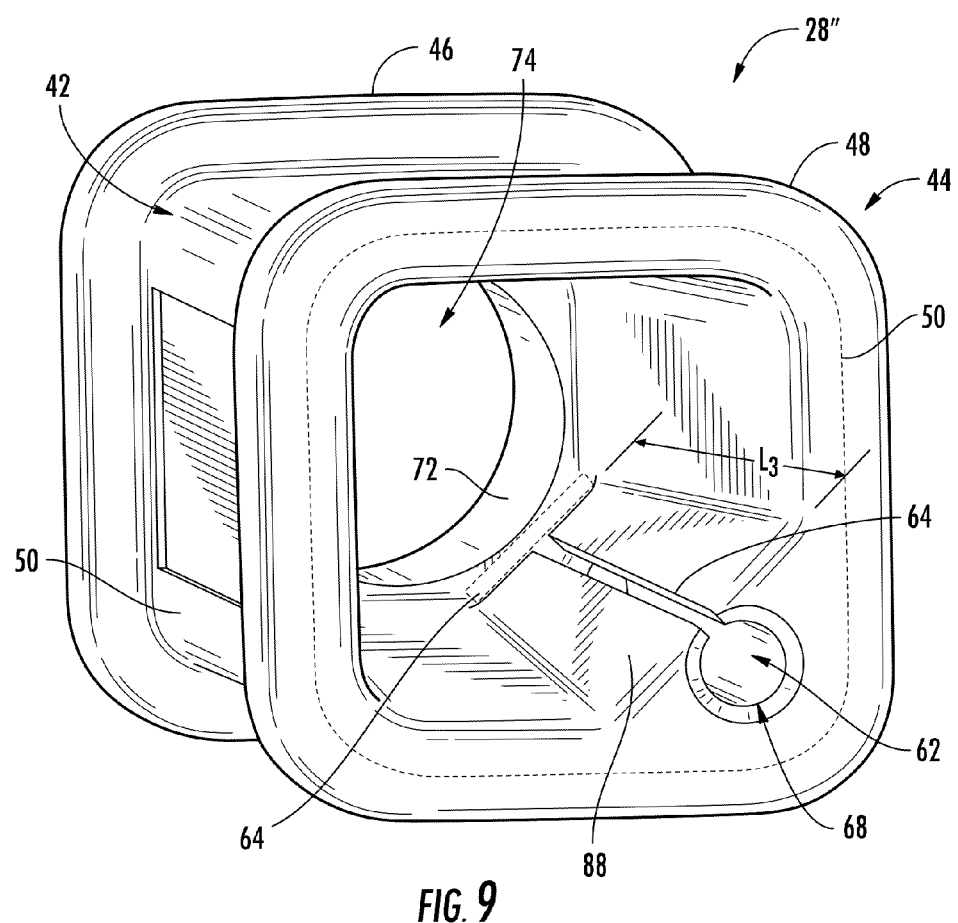
FIG. 9 is a perspective view of yet another example of a fiber optic furcation plug compatible with the fiber optic equipment of FIG. 1, illustrating another example of a segregated epoxy channel.

FIG. 9 is a perspective view of a fiber optic furcation plug 28" which is yet another example of the fiber optic furcation plug 28' of FIG. 8. Many features of the fiber optic furcation plug 28" are similar to the features of fiber optic furcation plug 28' and will not be repeated to increase conciseness and clarity. In this respect, fiber optic furcation plug 28" also includes the fiber containment surface 88; however, the epoxy interface opening 64 may extend at least partially across a length $L_3$ of the fiber containment surface 88. In this manner, the epoxy 30 may enter the fiber passageway 38 all along the length $L_3$ of the fiber containment surface 88 from the segregated epoxy channel 62 to provide a uniform application of the epoxy 30 within the fiber passageway 38. Although the fiber containment surface 88 includes the epoxy interface opening 64 along the length of the fiber containment surface 88, the optical fibers 16 cannot enter the segregated epoxy channel 62.

Figure 10:
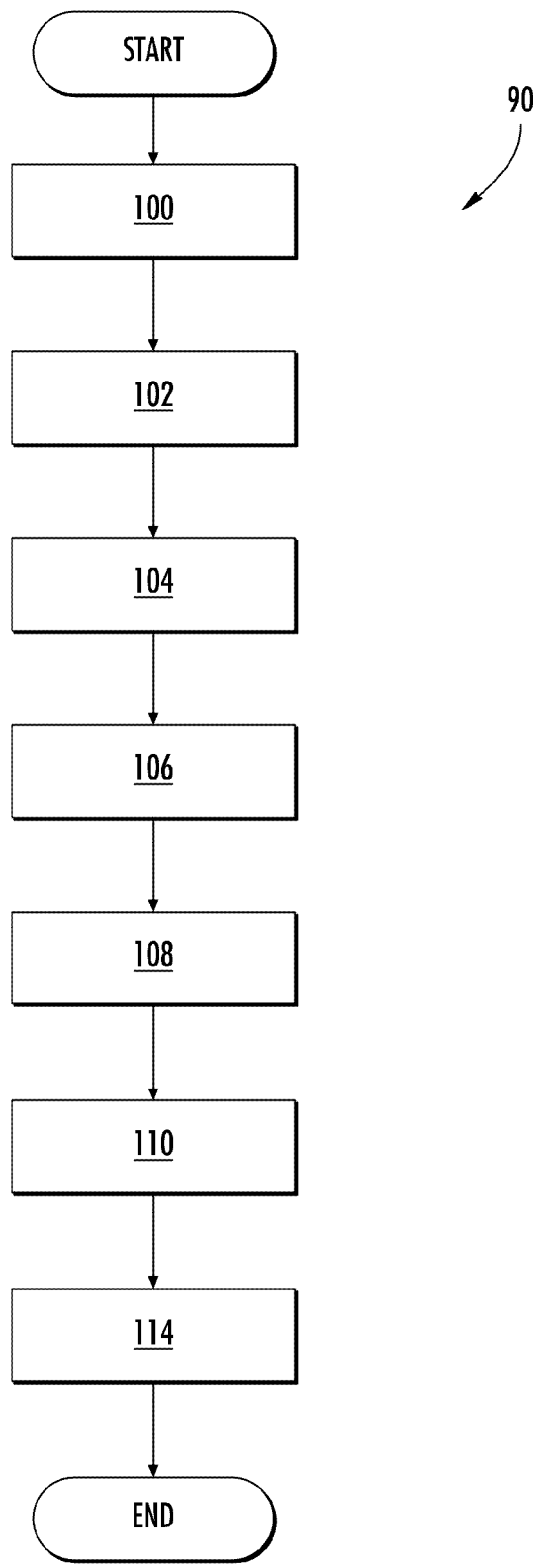
FIG. 10 is a block diagram of an exemplary process for furcating a fiber optic cable of FIG. 1 into the fiber optic furcation assembly of FIG. 1.

Now that the fiber optic furcation assembly 10 has been introduced, an exemplary process 90 of furcating the fiber optic cable 14 will be discussed. FIG. 10 is a flowchart diagram of the exemplary process 90 of furcating the fiber optic cable 14. The process 90 in FIG. 10 will be described using the terminology and information provided above. The process 90 may include providing the fiber optic cable 14 comprising the at least one optical fiber 16 disposed within the cable jacket 26 (step 100 in FIG. 10). The process 90 may also include exposing the end portion 56 of the at least one optical fiber 16 from the cable jacket 26 to form at least one fiber leg 101 (step 102 in FIG. 10).

Figure 11:
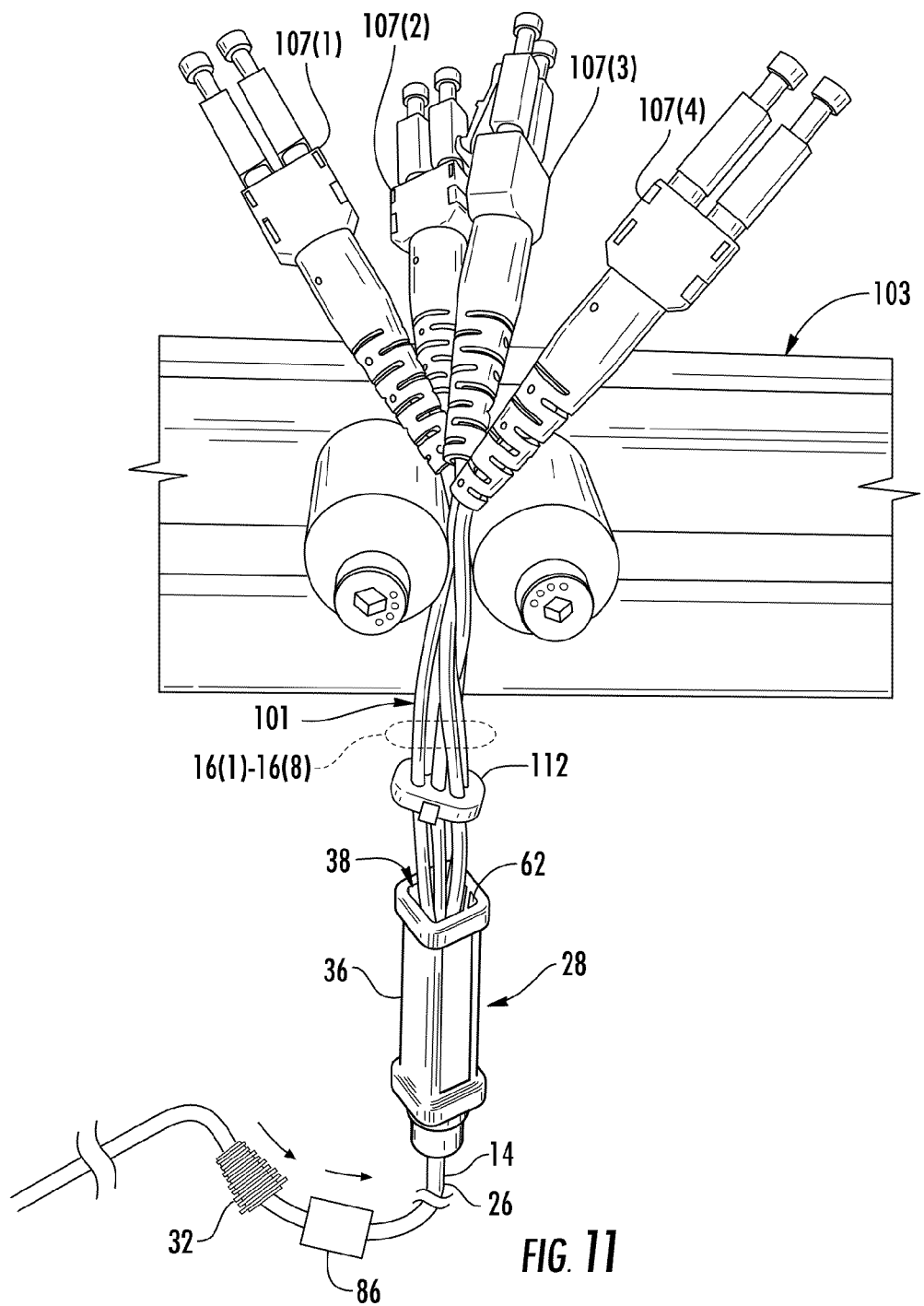
FIG. 11 is a perspective view of the fiber optic cable received through the fiber passageway of the fiber optic furcation plug of FIG. 1.

The process 90 may also include providing the fiber optic furcation plug 28 including the furcation body 36 extending longitudinally from the first end 42 to the second end 44 (step 104 in FIG. 10). As shown in FIG. 11, the process 90 may also include receiving the at least one fiber leg 101 in the fiber passageway 38 of the fiber optic furcation plug 28 (step 106 in FIG. 10). The fiber passageway 38 may be disposed through the furcation body 36 and may extend from the first opening 52 at the first end 42 of the furcation body 36 to the second opening 54 at the second end 44 of the furcation body 36. The end portion 56 of the at least one optical fiber 16 may be inserted through the cable holder 40 which is attached to the first end 42 of the furcation body 36. Optical connectors 107(1)-107(4) may be connected to the optical fibers 16(1)-16(8) to provide convenient termination to fiber optic components, for example, the fiber optic components 24(1)-24(4) of FIG. 1. The optical connectors 107(1)-107(4) may facilitate the optical fibers 16(1)-16(8) to be mounted to fixture 103 as shown in FIG. 11 in preparation to insert the epoxy 30. It is noted that the optical fibers 16(1)-16(8) may be routed through a fiber optic plug cap 112 before connection to the optical connectors 107(1)-107(4). The fiber optic plug cap 112 may be used to identify the optical fibers 16(1)-16(8).

As shown in FIG. 11, the process 90 may also include attaching the shrink wrap 86 to the cable jacket 26 of the fiber optic cable 14 and the cable holder 40 to prevent the epoxy 30 from exiting the fiber passageway 38 through the first opening 52 of the furcation body 36 (step 108 in FIG. 10). The strain relief boot 32 may be optionally attached to the cable holder 40 through the shrink wrap 86. The strain relief boot 32 may protect the fiber optic cable 14 from severe bending, which can damage the optical fibers 16(1)-16(8).

As depicted in FIG. 12, the process 90 may also include receiving the epoxy 30 in the segregated epoxy channel 62 (step 110 in FIG. 10). The segregated epoxy channel 62 may guide the epoxy 30 through the epoxy interface opening 64 into the fiber passageway 38 to secure the at least one fiber leg 101 to the furcation body 36. The epoxy 30 may be guided by inserting the epoxy syringe 84 into the segregated epoxy channel 62 and injecting the epoxy 30 from the epoxy syringe 84 into the segregated epoxy channel 62 adjacent to the epoxy interface opening 64, as shown in FIG. 12. The segregated epoxy channel 62 may be kept free of the at least one optical fiber 16 with the use of a separation wall 78 (FIG. 2).

As depicted in FIG. 13, the epoxy syringe 84 may be removed from the segregated epoxy channel 62 and a fiber optic plug cap 112 may be attached to the second end 44 of the fiber optic furcation plug 28 (step 114 in FIG. 10). It is noted that the epoxy 30 may be left to cure for a time period, for example, less than ten (10) minutes. Once the epoxy 30 has been cured, then the end portion 56 of the fiber optic cable 14 may be at that time secured to the furcation body 36. The fiber optic furcation assembly 10 may now be available to be secured to the fiber optic equipment 12 with the mechanical means.

Furcation plugs (e.g., as shown in FIGS. 2, 8-9, 13) may be formed in various sizes and used with various cable and leg configurations. A typical configuration may include a 3.5 mm diameter cable entering the furcation plug and either six (6) duplex 2.0 mm diameter legs going out of the plug, or twelve (12) single 1.6 mm diameter legs going out. In other embodiments, 144-fiber cable designs use larger furcation plugs according to the disclosure herein, when compared to the configuration above. Furcation plugs may be formed in other shapes (round, dog bone, etc.), fiber quantities, and sizes.

Use of the segregated channel allows for a particularly compact and efficient furcation plug configurations as described above, because space does not need to be provided for a syringe to reach through the cable-side opening and extend all the way through the furcation plug, between optical elements, without damaging the optical elements. Instead the epoxy path may be efficiently pre-formed and segregated from the optical elements, as discussed above, which allows for smaller, narrower furcation plugs that facilitate increased fiber density in cabinets and assemblies of data centers and elsewhere, where space is at a premium.

According to an exemplary embodiment, the number of legs departing the furcation plug is 6 duplex legs (two optical fibers per leg), 12 single legs one optical fiber per leg, or a combination thereof (e.g., four duplex, four single legs; two duplex, eight single legs). For furcation plugs having at least six legs (e.g., only six duplex legs), area for the exit opening of the furcation plug for the legs is about 10 mm by 10 mm, or about 100 square mm or less, such as 90 square mm or less, 80 square mm or less, or even smaller. In other embodiments, furcation plugs having at least six legs (e.g., only eight legs, fewer than ten legs), area for the exit opening of the furcation plug for the legs is about 125 square millimeters or less. In other embodiments, dimensions of the exit opening for the legs is 15 mm or less by 15 mm or less, such as about 10 mm (or less) by 13 mm (or less) for a furcation plug used with a 3.5 mm diameter cable.

In some embodiments, a cross-sectional area of each of the legs for any of the furcation assemblies described herein is at least 0.6 square mm, such as 0.9 mm diameter legs having a cross-sectional area of 0.64 square millimeters. According to an exemplary embodiment, the combined cross sectional area of a furcation assembly, as described herein, having at least six legs is at least 18 square mm, such as with a furcation plug supporting six 2.0 mm diameter legs have a combined cross-sectional area of 18.8 square mm; or at least 50 square mm, such as for a furcation plug supporting twelve 1.6 mm diameter legs have a combined cross-sectional area of 64 square mm). Use of the segregated filling path facilitates furcation plugs that can support such sizes of legs with the above-described exit opening areas, allowing the epoxy or other adhesive (e.g., thermoplastic resin; hot melt) to be appropriately placed and solidified (e.g., cured) without damaging the legs or other optical elements.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A fiber optic furcation plug, comprising:
   a furcation body extending longitudinally from a first end to a second end;
   a fiber passageway disposed through the furcation body extending from a first opening at the first end of the furcation body to a second opening at the second end of the furcation body, the fiber passageway is configured to receive an end portion of at least one optical fiber of a fiber optic cable; and
   a segregated epoxy channel disposed in the furcation body and segregated from the fiber passageway, the segregated epoxy channel configured to receive epoxy and guide the epoxy through an epoxy interface opening into the fiber passageway;
   wherein the segregated epoxy channel extends longitudinally from the first end of the furcation body to the second end of the furcation body, the fiber optic furcation plug further comprising a separation wall which forms a portion of the fiber passageway and a portion of the segregated epoxy channel, wherein the epoxy interface opening extends at least partially across a length of the separation wall, and wherein the separation wall comprises a shim to be attachably secured with the furcation body.

2. The fiber optic furcation plug of claim 1, wherein the fiber passageway is formed at least partially by an inner surface of the furcation body, and wherein the segregated epoxy channel is formed at least partially by an inner surface of the furcation body.

3. The fiber optic furcation plug of claim 1, further comprising at least one fiber containment surface configured to restrict latitudinal movement of the end portion of the at least one optical fiber and at least partially define the fiber passageway, wherein the segregated epoxy channel is at least partially disposed within a wall of the furcation body formed between an outer surface of the furcation body and the at least one fiber containment surface.

4. The fiber optic furcation plug of claim 1, wherein the furcation body further includes a plurality of grooves, and the shim is attachably secured to the plurality of grooves of the furcation body.

5. The fiber optic furcation plug of claim 1, further comprising a cable holder attached to the first end of the furcation body, and the cable holder including an end wall which partially closes the first opening at the first end of the fiber passageway, wherein the cable holder includes an inner cable holder surface forming a cable holder opening, the cable holder opening configured to allow the end portion of at least one optical fiber of a fiber optic cable to enter the fiber passageway, and wherein at least a portion of the epoxy interface opening is formed by the end wall.

6. A fiber optic furcation assembly, comprising:
 a fiber optic cable comprising at least one optical fiber disposed within a cable jacket, wherein an end portion of the at least one optical fiber is exposed from the cable jacket to form at least one fiber leg; and
 a fiber optic furcation plug, comprising:
  a furcation body extending longitudinally from a first end to a second end and configured to receive epoxy to be secured to the at least one optical fiber;
  a fiber passageway disposed through the furcation body extending from a first opening at the first end of the furcation body to a second opening at the second end of the furcation body, the fiber passageway is configured to receive at least one end portion of at least one optical fiber of a fiber optic cable;
  a segregated epoxy channel disposed in the furcation body and segregated from the fiber passageway, the segregated epoxy channel configured to receive epoxy and guide the epoxy through an epoxy interface opening into the fiber passageway; and
  a separation wall which forms a portion of the fiber passageway and a portion of the segregated epoxy channel, wherein the separation wall comprises a shim to be attachably secured with the furcation body.

7. The fiber optic furcation assembly of claim 6, wherein the fiber passageway is formed at least partially by an inner surface of the furcation body, and wherein the segregated epoxy channel is formed at least partially by an inner surface of the furcation body.

8. The fiber optic furcation assembly of claim 6, further comprising at least one fiber containment surface configured to restrict latitudinal movement of the end portion of the at least one optical fiber and at least partially define the fiber passageway, wherein the segregated epoxy channel is at least partially disposed within a wall of the furcation body formed between an outer surface of the furcation body and the at least one fiber containment surface.

9. The fiber optic furcation assembly of claim 6, wherein the segregated epoxy channel extends longitudinally from the first end of the furcation body to the second end of the furcation body.

10. The fiber optic furcation assembly of claim 6, wherein the furcation body further includes a plurality of grooves, and the shim is attachably secured to the plurality of grooves.

11. The fiber optic furcation assembly of claim 6, further comprising a cable holder attached to the first end of the furcation body, and the cable holder including an end wall which partially closes the first opening at the first end of the fiber passageway.

\* \* \* \* \*